(12) United States Patent
Cariello et al.

(10) Patent No.: US 12,182,407 B2
(45) Date of Patent: *Dec. 31, 2024

(54) MONITORING FLASH MEMORY ERASE PROGRESS USING ERASE CREDITS

(71) Applicant: Micron Technology, Inc., Boise, ID (US)

(72) Inventors: Giuseppe Cariello, Boise, ID (US); Fulvio Rori, Boise, ID (US); Jung Sheng Hoei, Newark, CA (US)

(73) Assignee: Micron Technology, Inc., Boise, ID (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/346,136

(22) Filed: Jun. 11, 2021

(65) Prior Publication Data

US 2021/0303172 A1    Sep. 30, 2021

Related U.S. Application Data

(63) Continuation of application No. 16/532,357, filed on Aug. 5, 2019, now Pat. No. 11,061,578.

(51) Int. Cl.
*G06F 3/06* (2006.01)

(52) U.S. Cl.
CPC .......... *G06F 3/0611* (2013.01); *G06F 3/0652* (2013.01); *G06F 3/0653* (2013.01); *G06F 3/0679* (2013.01)

(58) Field of Classification Search
CPC ..... G11C 2216/20; G11C 16/16; G11C 16/32; G11C 16/10; G11C 16/26; G11C 29/028;
(Continued)

(56) References Cited

U.S. PATENT DOCUMENTS 3,597,552 A    8/1971    Goto
5,287,469 A *  2/1994    Tsuboi ................... G11C 16/08
                                              711/103
(Continued)

FOREIGN PATENT DOCUMENTS

EP    617377    9/1994

OTHER PUBLICATIONS

Wikipedia, "EEPROM", Jul. 13, 2018, Internet Archive, the Wikipedia page as preserved by the Internet Archive on Jul. 13, 2018, pp. 1-10 http://web.archive.org/web/20180713055759/https://en.wikipedia.org/wiki/EEPROM (Year: 2018).*

(Continued)

*Primary Examiner* — Curtis James Kortman
(74) *Attorney, Agent, or Firm* — Greenberg Traurig

(57) ABSTRACT

The progress of an erase operation for a memory device is monitored using an erase credit mechanism. In one approach, an erase operation is performed to erase a memory. Erase pulse slices used in the erase operation are monitored. Erase credits associated with the erase operation are determined. The erase credits include an erase credit associated with each of the erase pulse slices. Based on the erase credits, an extent of erasure of the memory is determined. In response to determining that the extent of erasure has reached a predetermined threshold, the erase operation is terminated.

19 Claims, 7 Drawing Sheets

(58) Field of Classification Search
CPC ............ G11C 11/5635; G11C 11/5628; G11C 16/3445; G11C 16/14; G11C 16/5628; G11C 11/5642; G06F 3/0679; G06F 3/0688; G06F 3/0652; G06F 3/0611; G06F 3/061; G06F 3/0653; G06F 3/0659; G06F 3/064; G06F 12/0246; G06F 2212/7205; G06F 13/161; G06F 1/329
See application file for complete search history.

(56) References Cited

U.S. PATENT DOCUMENTS

| | | | |
|---|---|---|---|
| 5,412,793 A | 5/1995 | Kreifels et al. | |
| 6,279,070 B1 | 8/2001 | Jeong et al. | |
| 9,679,658 B2 | 6/2017 | Pelster et al. | |
| 10,643,711 B1* | 5/2020 | Yuan | G11C 16/32 |
| 11,061,578 B2 | 7/2021 | Cariello et al. | |
| 2002/0114182 A1 | 8/2002 | Piersimoni et al. | |
| 2004/0047181 A1* | 3/2004 | Piersimoni | G11C 16/16 365/185.01 |
| 2006/0262607 A1 | 11/2006 | Aritome | |
| 2007/0014170 A1 | 1/2007 | Patel et al. | |
| 2009/0010071 A1* | 1/2009 | Lee | G11C 16/16 365/185.29 |
| 2011/0055453 A1* | 3/2011 | Bennett | G11C 16/26 711/E12.001 |
| 2012/0254515 A1* | 10/2012 | Melik-Martirosian | G06F 12/0246 711/E12.008 |
| 2014/0215175 A1* | 7/2014 | Kasorla | G06F 13/24 711/167 |
| 2014/0269068 A1 | 9/2014 | D'abreu et al. | |
| 2015/0248922 A1* | 9/2015 | Hyun | G11C 16/16 365/189.011 |
| 2015/0255476 A1 | 9/2015 | Yu | |
| 2015/0287468 A1* | 10/2015 | Yi | G11C 16/16 365/185.11 |
| 2018/0004421 A1* | 1/2018 | Kang | G06F 3/0604 |
| 2021/0042037 A1 | 2/2021 | Cariello et al. | |

OTHER PUBLICATIONS

Wu et al., "Reducing SSD Read Latency via NAND Flash Program and Erase Suspension," Department of Electrical and Computer Engineering, Virginia Commonwealth University, Richmond, VA (retrieved from Internet search on Jul. 23, 2019).

* cited by examiner

MONITORING FLASH MEMORY ERASE PROGRESS USING ERASE CREDITS

RELATED APPLICATIONS

The present application is a continuation application of U.S. patent application Ser. No. 16/532,357, filed Aug. 5, 2019 and entitled "Monitoring Flash Memory Erase Progress Using Erase Credits," the entire disclosure of which application is hereby incorporated herein by reference.

FIELD OF THE TECHNOLOGY

At least some embodiments disclosed herein relate to memory device operations in general and more particularly, but not limited to monitoring erase or program progress for a memory device using a credit mechanism.

BACKGROUND

Various types of memory devices are used to store data for computing systems. One type of memory device uses flash memory to store data. Flash memory is a non-volatile computer storage medium that is electrically erased and programmed. One type of flash memory is NAND-type, which can be written and read, for example, in blocks of data. NAND-type flash memory is often used in memory cards, USB flash drives, and solid-state drives (SSDs) for storage of data.

Flash memory provides non-volatile storage with relatively fast read access times. Exemplary applications that use flash memory include personal computers, digital audio players, digital cameras, and mobile devices.

In some NAND-type flash memory devices, after a page program or block erase command is issued, a subsequent read request has to wait until the relatively time-consuming program or erase operation is completed. Thus, such read requests suffer from a prolonged service latency due to the waiting time.

One flash memory approach uses program/erase suspension in which execution of a program or erase operation is suspended in order to service pending reads. The suspended program or erase operation is resumed after servicing the pending read.

In one example of an erase operation for NAND flash, the erase process consist of two phases. The first phase uses an erase pulse lasting for an erase time period that is applied on a target block in memory. The second phase uses a verify operation that is performed to determine whether the preceding erase pulse has successfully erased all bits in the block.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
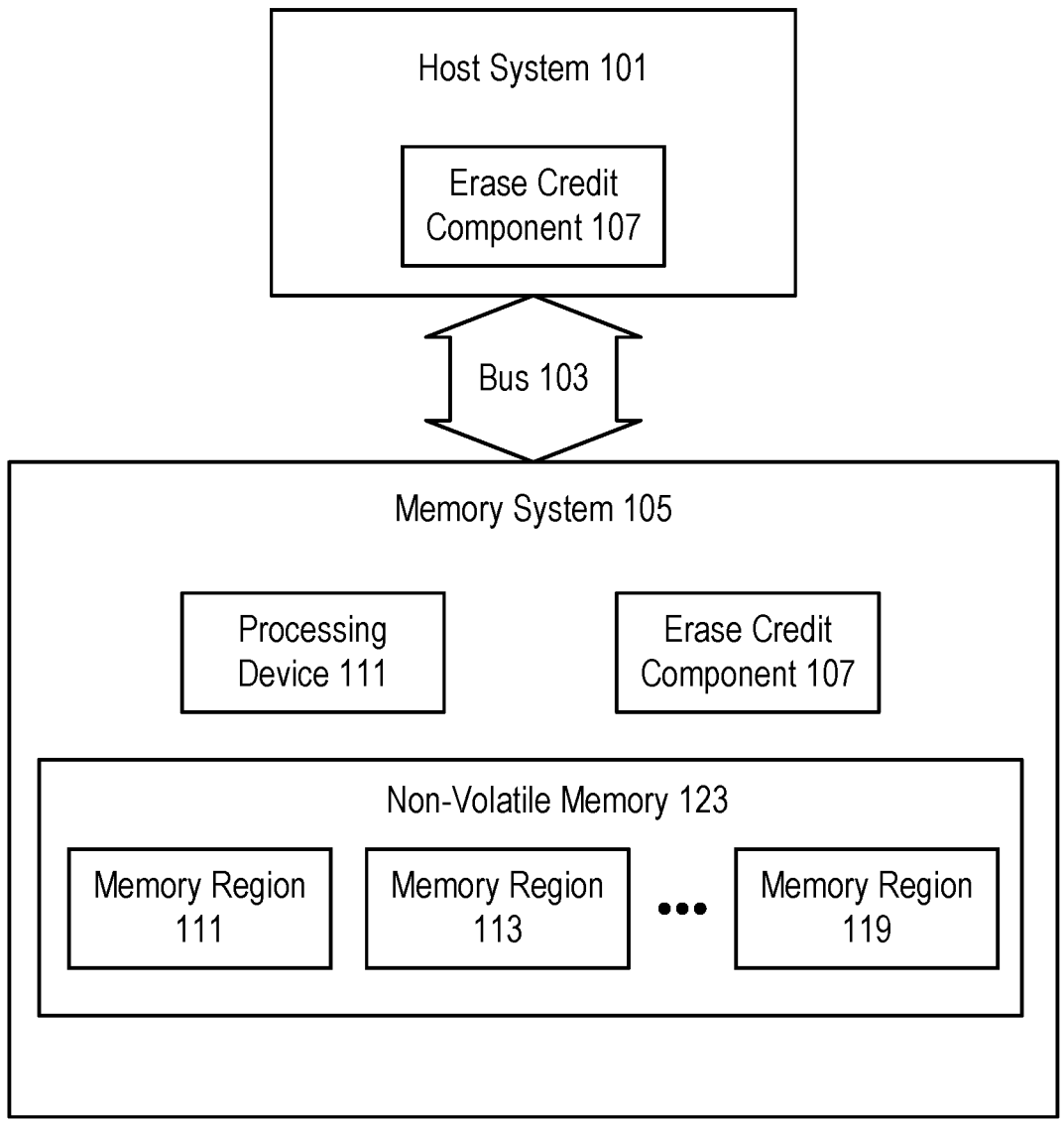
FIG. 1 shows an example computing system having an erase credit component, in accordance with some embodiments of the present disclosure.

At least some embodiments herein relate to monitoring progress during erase or program operations for a memory device. In one embodiment, an erase credit counter is used to determine an extent of erase progress so that an erase operation continues to make progress during a storm of reads (e.g., a large number of read requests sent from a host device in a relatively short time period).

In prior flash memory systems, erase operations are suspended to service read requests. Specifically, when using this approach, verify and erase pulses are interrupted. The verify and erase pulses are then repeated after resuming the erase operation. However, in case of frequent interruption, the erase will be performed significantly slower than desired. As a result, all of the incoming read requests can be impacted by this interruption overhead. In more severe cases, the erase operation may not operate efficiently and cause reliability issues.

In the case of existing managed NAND systems, in order to assure low read latency (e.g., to meet Quality of Service requirements), program and erase operations are suspended. For example, in existing implementations, a NAND system aborts an ongoing sub-operation (e.g., a pulse or verify) to handle an interruption caused by a read request. Upon resume, the interrupted operation resumes at the previously-defined entry point associated with the interruption. When resuming, a verify operation is performed first to check effectiveness of the interrupted program/erase pulse. In general, the repetition arising from such suspended operations causes the technical problem of negatively impacting the overall efficiency of the NAND system (e.g., increased latency due to the suspended operation). In more severe cases, this repetition can lead to memory system timeouts, performance degradation, and a negative impact on system reliability.

In some cases, masking the interrupt to allow a current sub-operation to finish may work for a program operation (this is done to assure progress of the memory system operating algorithm). However, this masking approach is not able to match the latency requirement for an erase operation (e.g., the erase pulse requires too much time to adequately perform the erasing of a block of memory).

In one example of existing managed NAND systems, erasing of the memory is done in two main phases. These phases are an erase pulse and a verify operation. An erase pulse is applied to the memory, and then a verify operation is performed to determine whether the memory is sufficiently erased. A large number of interruptions caused by read requests interfere with the foregoing two-phase process. In particular, when erasing is resumed, the erase does not restart from the erase pulse. Instead, in existing systems, the process always restarts from the verify operation. This creates the technical problem of adding significant latency to the erase operation. For example, if an erase is resumed and then suspended fairly immediately after resuming, then the erase will not make forward progress because the same verify operation is repeated on each restart. These existing systems must restart with a verify operation because the systems are not able to otherwise determine the extent of progress in erasing the memory.

Various embodiments of the present disclosure provide a technological solution to one or more of the above technical problems. For example, in one embodiment, a memory system virtually slices the erase pulse (e.g., by adding one or more interruption points due to read requests), and uses a credit system to track erase effectiveness. In one example, a credit mechanism for erasing a NAND-type flash memory is implemented to monitor an extent of erase by using a counter to track erase pulse slices used in an erase operation. One benefit from the foregoing is that the erase progress can be ensured even when there is a suspension storm (e.g., a large number of read requests received from a host system in a short period of time).

As used herein, a "pulse slice" is the applying of an erase or programming voltage over a time period for erasure or programming of a memory. In one example, an erase pulse slice is a time period over which an erase voltage is applied for the erasure of a memory. In one example, the erase voltage used for the erase pulse slice is achieved after ramping an erase voltage from an initial voltage (e.g., such as a voltage used on a bus or line of a memory chip during a read operation) to a final maximum voltage (e.g., a maximum design or operating voltage used for erasing a block or sub-block of memory cells). In one example, an erase pulse slice uses an erase voltage of 16 volts over a time period of T microseconds ("T" is an arbitrary time value that varies for a particular design).

As used herein, a "ramp" is the ramping of an erase or program voltage (e.g., the erase voltage can be increased prior to an initial erase pulse slice of a set of erase pulse slices, or decreased after the last of a set of erase pulse slices) over a time period from an initial voltage to a final operating voltage to be used for a particular erase or program operation to be implemented (e.g., a ramp to increase voltage from 0 V to a maximum voltage used to erase a sub-block of memory). For example, in an erase operation, a ramp is used to increase an erase voltage of a bus or line of a memory device from an initial voltage to a final operating voltage prior to using one or more erase pulse slices to erase, for example, one or more memory cells, or one or more sub-blocks of a memory array. In one example, a ramp is used to increase a voltage of a bus or line from 0 V to 16 V over a time period of T microseconds.

In one embodiment, a method includes: performing an erase operation to erase a memory; monitoring erase pulse slices used in the erase operation; determining erase credits associated with the erase operation, wherein the erase credits include a respective erase credit associated with each of the erase pulse slices; determining, based on the erase credits, an extent of erasure of the memory; and in response to determining that the extent of erasure has reached a predetermined threshold, completing the erase operation.

In one example, a sub-block of a memory normally requires an erase pulse of 10T microseconds in the absence of interruption. During an erase operation, due to read request interruptions, ten erase pulse slices each having a time period of T microseconds are used to erase the memory. For example, each erase pulse slice is used starting from an interruption point caused by a read request from the host system. During the erase operation, a counter maintains an ongoing total of erase credits associated with each erase pulse slice. In this example, each of the erase pulse slices is assigned a weight of 100 based on the time period of the slice. When the counter reaches a predetermined threshold total of 1,000 erase credits (e.g., which corresponds to the 10T microseconds normal erase pulse), then the memory system determines that the memory is fully erased. In other examples, the time period associated with each pulse slice may vary. In such case, the weight of the corresponding erase credit will vary. For example, an erase pulse slice having a time period of 2T microseconds is assigned a weight of 200.

In the foregoing example, each erase pulse slice has an equal erase voltage. In other cases, the voltage of each erase pulse slice may vary. The weight assigned to the erase credit for such erase pulse slice may be based on both the time period of the erase pulse slice and its voltage.

In one example, an erase credit counter reaches a predetermined threshold corresponding to full erasure of the memory. In response to reaching this threshold, the erase operation is completed. In one example, the erase operation is completed by terminating any further erase pulse slices. In one example, the erase operation is completed by performing a verify operation to confirm sufficient or full erasure of the memory. In one example, after the verify operation confirms sufficient or full erasure, a signal is sent by the memory device to the host system indicating that the memory has completed the erase operation.

In one embodiment, the predetermined threshold can vary for each of several memory types in a memory device. For example, dedicated latches of the memory device can be used to allow independent tuning of the credit threshold for each memory type. In addition, the erase credit weight assigned to an erase pulse slice or a ramp can vary based on the memory type of the memory being erased. In one example, the credit threshold and/or credit weight corresponds to the silicon or other semiconductor characteristics of the memory device. In one example, the credit threshold and/or credit weight are determined empirically and then programmed into the memory device.

In one embodiment, the erase credits tracked by the counter above can further include erase credits associated with one or more ramps used in the erase operation. For example, a ramp from 0 V to 16 V over a time period of T microseconds can be assigned a weight of 50 erase credits. It should be noted that in this example the erase credits associated with a ramp are typically less than the erase credits associated with a pulse slice of the same time length. This reflects that the erasure of a memory typically occurs to a lesser extent at ramp voltages lower than the full operating erase voltage.

In one embodiment, the erase credit weight assigned to a ramp may be based on both the time period of the ramp and the voltage profile of the ramp. For example, a ramp having a lower final voltage will have a lower erase credit weight.

In some cases, if the ramp used in an erase operation is interrupted before reaching a final erase voltage, then the ramp may have no erase effect such that the erase credit is zero. Thus, the erase progress cannot be ensured. However, according to the present disclosure, the foregoing problem can be overcome by disabling interruption of an erase operation based on counting a number of ramps that have been interrupted by a suspend request.

In one embodiment, a number of ramps that have been interrupted by a suspend request is tracked by a counter. In response to determining that the number of interrupted ramps has reached a threshold, further interruption of an erase operation by any subsequent suspend request can be disabled until the erase operation is completed.

In one example, one read latency is sacrificed periodically in order to ensure that the ramp is finished so that erase progress is made. For example, if a ramp is longer than a maximum suspension latency requirement of a memory device, then further suspend requests can be disabled based on a number of interrupted ramps that have occurred during the current erase operation.

In one embodiment, the erase credits are used to delay any suspend request until at least a minimum predetermined extent of erasure is accomplished. In one example, suspension of an erase operation is disabled or delayed until at least a predetermined erase credit total value has been achieved. After the predetermined erase credit total is reached, then the erase operation is interrupted and the read request is serviced by performing a read operation.

Various embodiments are described herein as regards an erase operation. However, credits associated with a program operation in a memory device can be determined and used in a manner similarly as used for an erase operation. In one embodiment, a method includes performing an program operation for a memory, the program operation using pulse slices; determining credits associated with the program operation, wherein the credits include a respective credit associated with each of the pulse slices; determining, based on the credits, an extent of programming of the memory; and in response to determining that the extent of programming has reached a predetermined threshold, completing the program operation.

FIG. 1 shows an example computing system having an erase credit component 107, in accordance with some embodiments of the present disclosure. The erase credit component 107 can be implemented in various computing systems. In one example system, a processing device (e.g., a system-on-chip (SOC), FPGA, CPU, or GPU) stores and/or accesses data stored in non-volatile memory device (s) (e.g., devices using NAND flash memory or cross point memory (such as 3DXP memory), or a SSD).

A host system 101 communicates over a bus 103 with a memory system 105. A processing device 111 of memory system 105 has read and write access to memory regions 111, 113, . . . , 119 of non-volatile memory 123. In one example, host system 101 reads data from and writes data to non-volatile memory 123.

In one example, the processing device 111 and the memory regions 111, 113, . . . , 119 are on the same chip or die. In some embodiments, the memory regions store data used by the host system 101 and/or the processing device 111 during processing for machine learning, and/or store other data generated by software process(es) executing on host system 101 or on processing device 111.

The computing system includes an erase credit component 107 in the memory system 105 that tracks erase credits to monitor progress of an erase operation associated with one or more memory regions of the memory system 105. The computing system can further include the erase credit component 107 in the host system 120 that coordinates with the erase credit component 107 in the memory system 105 to at least facilitate tracking of the erase credits. In various embodiments, the erase credit component 107 determines whether one or more memory regions of non-volatile memory 123 are sufficiently erased based on an ongoing total of erase credits stored in, for example, a counter (not shown).

In one embodiment, memory system 105 receives a read request to access data stored in non-volatile memory 123. In response receiving the request, memory system 105 accesses data stored in one or more of the memory regions. The memory system 105 provides the data in response to the read request to access the data. In one example, the request to access the data is received over bus 103 from host system 101.

In some embodiments, non-volatile memory 123 is used to store data in response to a write command received over bus 123 from a processing device (not shown) of host system 101.

In some embodiments, processing device 111 includes at least a portion of the erase credit component 107. In other embodiments, or in combination, the processing device 111 and/or a processing device in the host system 101 includes at least a portion of the erase credit component 107. For example, processing device 111 and/or a processing device of the host system 101 can include logic circuitry implementing certain portions of the erase credit component 107. For example, a controller or processing device (processor) of the host system 101 can be configured to execute instructions stored in memory for performing the operations of certain of the steps of the erase credit component 107 described herein.

In some embodiments, the erase credit component 107 is implemented in an integrated circuit chip disposed in the memory system 105. In other embodiments, portions of the erase credit component 107 in the host system 120 can be part of an operating system of the host system 120, a device driver, or an application.

An example of memory system 105 is a memory module that is connected to a central processing unit (CPU) via a memory bus. Examples of memory modules include a non-volatile dual in-line memory module (NVDIMM), etc. In some embodiments, the memory system can be a hybrid memory/storage system that provides both memory functions and storage functions. In general, a host system can utilize a memory system that includes one or more memory regions. The host system can provide data to be stored at the memory system and can request data to be retrieved from the memory system. In one example, a host can access various types of memory, including volatile and non-volatile memory.

The host system 101 can be a computing device such as a controller in a vehicle, a network server, a mobile device, a cellular telephone, an embedded system (e.g., an embedded system having a system-on-chip (SOC) and internal or external memory), or any computing device that includes a memory and a processing device. The host system 101 can include or be coupled to the memory system 105 so that the host system 101 can read data from or write data to the memory system 105. The host system 101 can be coupled to the memory system 105 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 101 and the memory system 105. The physical host interface can provide an interface for passing control, address, data, and other signals between the memory system 105 and the host system 101. FIG. 1 illustrates a memory system 105 as an example. In general, the host system 101 can access multiple memory systems via a same communication connection, multiple separate communication connections, and/or a combination of communication connections.

The host system 101 can include a processing device and a controller (not shown). The processing device of the host system 101 can be, for example, a microprocessor, a central processing unit (CPU), a processing core of a processor, an execution unit, etc. In some instances, the controller of the host system can be referred to as a memory controller, a memory management unit, and/or an initiator. In one example, the controller controls the communications over bus 103 between the host system 101 and the memory system 105.

A controller of the host system 101 can communicate with a controller of the memory system 105 to perform operations such as reading data, writing data, or erasing data at the memory regions of non-volatile memory 123. In some instances, the controller is integrated within the same package of the processing device 111. In other instances, the controller is separate from the package of the processing device 111. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

In one embodiment, the memory regions 111, 113, . . . , 119 can include any combination of different types of non-volatile memory components. In some embodiments, the memory regions can be, but are not limited to, NAND flash memory or cross point memory. In some embodiments, the non-volatile memory can include, flash memory, ferro-electric RAM, and computer storage devices (e.g. hard disk drives and solid state drives). Furthermore, the memory cells of the memory regions can be grouped as memory pages or data blocks that can refer to a unit used to store data.

In one embodiment using erase credit component 107, one or more controllers of the memory system 105 can communicate with the memory regions 111, 113, . . . , 119 to perform operations related to erasing data. Each controller can include hardware such as one or more integrated circuits and/or discrete components, a buffer memory, or a combination thereof. Each controller can be a microcontroller, special purpose logic circuitry (e.g., a field programmable gate array (FPGA), an application specific integrated circuit (ASIC), etc.), or another suitable processor. The controller(s) can include a processing device (processor) configured to execute instructions stored in local memory. In one example, local memory of the controller includes an embedded memory configured to store instructions for performing various processes, operations, logic flows, and routines that control operation of the memory system 105, including handling communications between the memory system 105 and the host system 101. In some embodiments, the local memory can include memory registers storing memory pointers, fetched data, etc. The local memory can also include read-only memory (ROM) for storing micro-code.

In general, controller(s) of memory system 105 can receive commands or operations from the host system 101 and/or processing device 111 and can convert the commands or operations into instructions or appropriate commands to achieve the data transfer for the identified memory regions. The controller can also be responsible for other operations such as wear leveling operations, garbage collection operations, error detection and error-correcting code (ECC) operations, encryption operations, caching operations, and address translations between a logical block address and a physical block address that are associated with the memory regions. The controller can further include host interface circuitry to communicate with the host system 101 via the physical host interface. The host interface circuitry can convert the commands received from the host system into command instructions to access one or more of the memory regions as well as convert responses associated with the memory regions into information for the host system 101.

The memory system 105 can also include additional circuitry or components that are not illustrated. In some embodiments, the memory system 105 can include a cache or buffer (e.g., DRAM or SRAM) and address circuitry (e.g., a row decoder and a column decoder) that can receive an address from one or more controllers and decode the address to access the memory regions.

In some embodiments, a controller in the host system 101 or memory system 105, and/or the processing device 111 includes at least a portion of the erase credit component 107. For example, the controller and/or the processing device 111 can include logic circuitry implementing portions of the erase credit component 107. For example, a processing device (processor) can be configured to execute instructions stored in memory for performing operations that provide read/write access to memory regions for the erase credit component 107 as described herein. In some embodiments, the erase credit component 107 is part of an operating system, a device driver, or an application.

Figure 2:
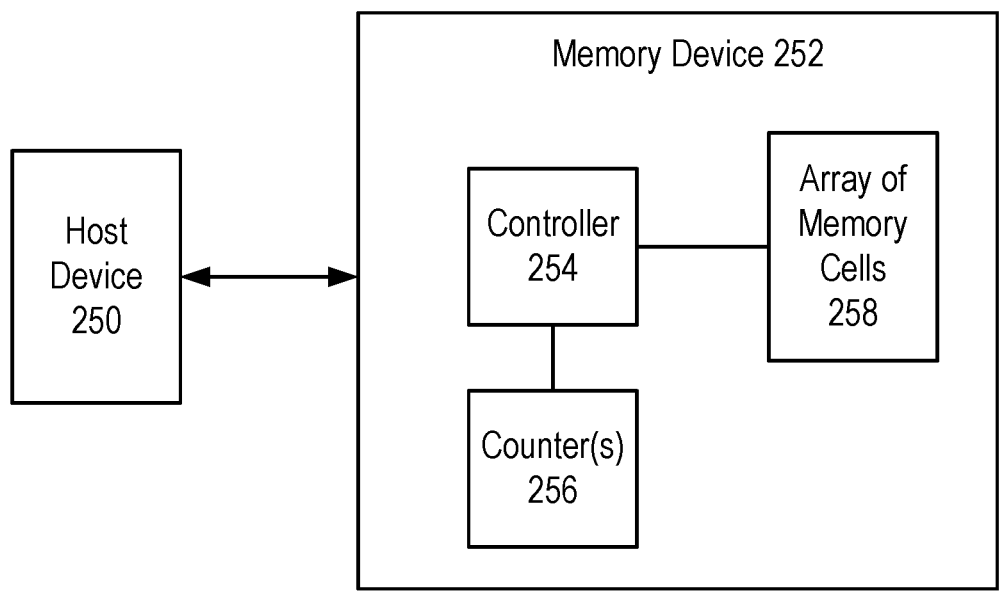
FIG. 2 shows an example of a host device that accesses data stored in a memory device, according to one embodiment.

FIG. 2 shows an example of a host device 250 that accesses data stored in a memory device 252, according to one embodiment. Host device 250 can write data for storage to memory device 252, and read data from memory device 252 (e.g., using one or more read requests sent over a communication interface). Each of the host device 250 and the memory device 252 can include a number of receiver or driver circuits configured to send or receive signals over the communication interface. In one example, memory device 252 is a universal flash storage (UFS) device, or an embedded MMC (eMMC) device.

In one example, memory device 252 receives control signals at controller 254 from host device 250 over a control link. The control signals can include a chip enable CE #, a command latch enable CLE, an address latch enable ALE, a write enable WE #, a read enable RE #, and a write protect WP #. Additional or alternative control signals may be further received over the control link depending upon the nature of the memory device 252. Memory device 252 receives command signals (which represent commands), address signals (which represent addresses), and data signals (which represent data) from host device 250, for example, over a multiplexed input/output (I/O) bus.

Memory device 252 includes an array of memory cells 258. Memory cells of at least a portion of array of memory cells 258 are capable of being programmed to one of at least two data states. In one example, the array of memory cells 258 is a NAND flash memory array. The memory cells of array 258 can be arranged in blocks (memory cell blocks). Each block can include sub-blocks.

In some embodiments, memory cells of the array 258 may have mixed memory cell types integrated in the same integrated circuit (IC) chip. In one example, the memory cells can include floating gate memory cells, charge trap memory cells, or other types of non-volatile memory cells. In one example, the memory cells can include ferroelectric memory cells, phase change memory cells, resistive memory cells, conduction bridge memory cells, and spin-transfertorque magnetic random access memory (STT-MRAM) cells, or other types of non-volatile memory cells.

Memory device 252 includes a controller 254 that controls access to the array of memory cells 258 in response to commands (e.g., commands received from host device 250). In general, the controller 254 can receive commands or operations from the host device 250 and can convert the commands or operations into instructions or appropriate commands to achieve the desired access to various memory components of memory device 252. For example, the controller 254 can communicate with the array of memory cells 258 to perform operations such as reading data, writing data, or erasing data and other such operations (e.g., in response to commands scheduled on a command bus). In one example, the controller 254 generates status information for a processor of host device 250. In one example, the controller 254 is configured to perform access operations including read operations, program operations, and/or erase operations.

In one example, during a program operation (e.g., write operation), data is passed for transfer to the array of memory cells 258. During a read operation, data is passed for output to the host device 250.

In one embodiment, the controller 254 controls an erase operation to erase at least a portion of the array of memory cells 258. Controller 254 monitors erase pulse slices used in the erase operation. In one example, these erase pulse slices are applied to a sub-block in array 258. As each erase pulse slice is applied, controller 254 determines an erase credit associated with the erase pulse slice. The value of this erase credit is stored in one of counters 256. As each erase pulse slice is applied, counter 256 is increased by the erase credit for that particular slice.

As the erase operation progresses, controller 254 determines an extent of erasure of the memory cells based on the erase credit total retrieved from counter 256. When the controller 254 determines that the extent of erasure has reached a predetermined threshold, the erase operation is completed. In one embodiment, the predetermined threshold is a predetermined erase credit total. In one example, the predetermined erase credit total corresponds to full erasure of a memory. In one example, the predetermined erase credit total is determined based on characterization of one or more physical IC chips that contain memory device 252.

Figure 3:
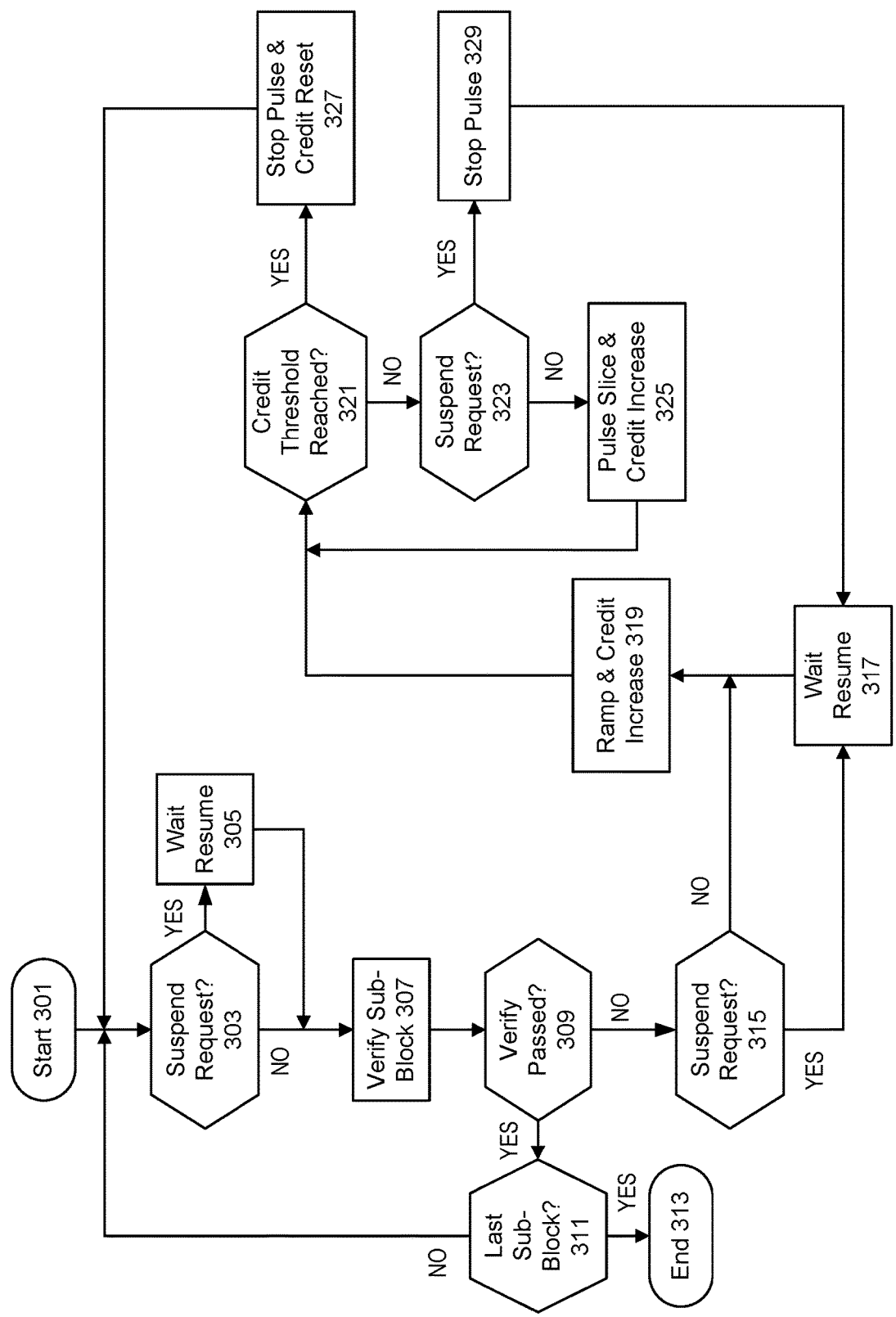
FIG. 3 shows an exemplary flow chart illustrating a process to perform erase operations for a memory device, according to one embodiment.

FIG. 3 shows an exemplary flow chart illustrating a process to perform erase operations for a memory device, according to one embodiment. In one example, the memory device is memory device 252 of FIG. 2. Although erase operations are now discussed below for purposes of illustration, a similar process can be used for program operations.

An erase operation to erase one or more sub-blocks of a memory starts at block 301. At block 303, a controller (e.g., controller 254) determines whether a suspend request has been received. If yes, then at block 305 the erase operation is suspended while a read operation is performed. After completing the read operation, the erase operation is resumed.

Next, at block 307, the erasure state of the current sub-block is verified. If the verification is passed at block 309, then at block 311 the controller determines whether this is the last sub-block to be erased. If yes, then the erase operation ends at block 313. Otherwise, the erase operation advances to the next sub-block.

If the verification of the current sub-block is not passed, then the controller determines at block 315 whether a suspend request has been received. If yes, then at block 317 the erase operation is suspended while a read operation is performed.

Next, at block 319, a ramp is performed. The controller determines an erase credit corresponding to the ramp, and increases an ongoing erase credit total.

At block 321, the controller determines whether a credit threshold has been reached. If yes, then at block 327 the erase operation for the current sub-block is terminated. The erase credit total is reset to zero in preparation for erasing the next sub-block. For example, counter 256 is reset to zero. In one embodiment, a verify operation is performed to confirm that the sub-block has been adequately erased. If not, then the erase is resumed for the sub-block.

In some embodiments, two or more counters 256 are used, with each counter corresponding to a different memory type. At block 327, the counter 256 corresponding to the memory type of the sub-block that has just been erased is reset.

At block 323, if the credit threshold has not been reached, then the controller determines whether a suspend request has been received. If yes, at block 329, the current erase pulse or pulse slice is stopped. Then, at block 317, a read operation is performed.

At block 323, if a suspend request is not been received, then at block 325 an erase pulse slice is applied to the memory. The controller determines an erase credit corresponding to the erase pulse slice. The erase credit is added to the ongoing erase credit total. After applying the erase pulse slice, at block 321 the controller determines whether the credit threshold has been reached. If yes, then at block 327 further erase pulses are stopped for the just-erased sub-block.

Next, at block 303, the controller determines whether a suspend request has been received. If not, then at block 307, the erasure state of the just-erased sub-block is verified. At block 309, if the verification is passed, then the erase operation continues with any remaining sub-blocks.

Figure 4:
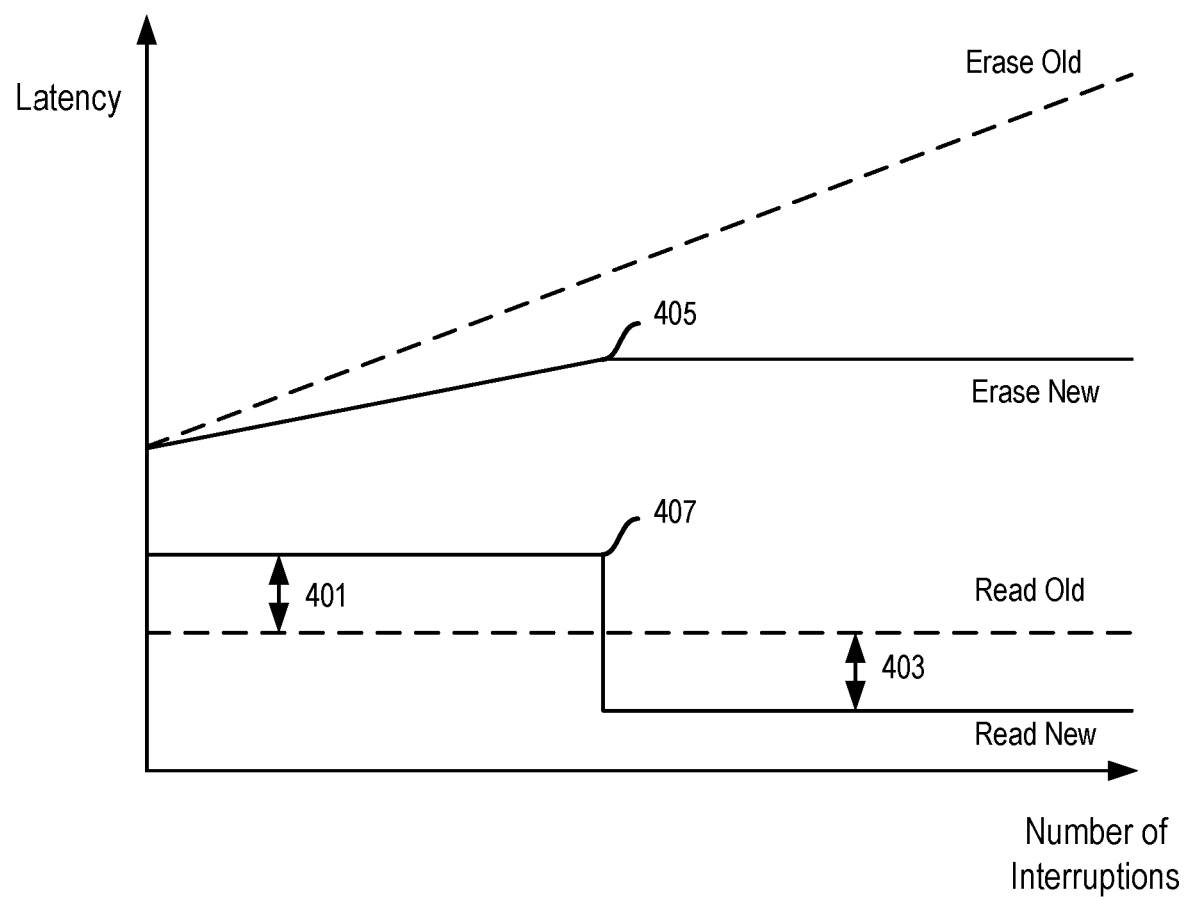
FIG. 4 shows an exemplary graph illustrating latency for erase and read operations in a memory device, according to one embodiment.

FIG. 4 shows an exemplary graph illustrating latency for erase and read operations in a memory device, according to one embodiment. More specifically, a latency characteristic for an erase operation of a prior approach (Erase Old) is compared to a latency characteristic for an erase operation of the approach of the present disclosure (Erase New). Also, a latency characteristic for a read operation of the prior approach (Read Old) is compared to a latency characteristic of a read operation for the approach of the present disclosure (Read New).

As illustrated, latency for a read or erase operation is presented on the vertical axis, and a number of interruptions is presented on the horizontal axis. In the simple case where there are no interruptions to the erase operation, then the erase latency is the same in both the old and new approaches.

In the old approach, as the number of interruptions increases, the erase progress is impeded because the erase operation is interrupted to an increasing degree. Thus, as the number of interruptions increases, the latency of the erase operation in the old approach increases continually. As mentioned above, in severe cases, as the number of interruptions increases to large numbers, then the erase operation may fail.

As illustrated, the latency for the read operation in the old approach remains constant as the number of interruptions increases. This constant latency reflects the time required to perform the read operation plus the time that the erase operation needs to enter a suspend mode.

In the new approach, erase progress in the erase operation is ensured so that a point 405 is reached at which the memory is fully erased. Thus, an additional member of interruptions after reaching point 405 does not increase the latency of the erase operation (the memory has completed the erase operation and no further erase is performed).

In the new approach, the read latency is greater by an amount 401 as compared to the old approach. This reflects that additional read latency is tolerated in the new approach so that the erase progress can be ensured as described above. However, when the memory has been fully erased (which corresponds to point 405 as discussed above), at point 407 the read latency is smaller by an amount 403 as compared to the old approach. This reflects that no further latency overhead is required to ensure erase progress, as the memory is already fully erased. For example, using the new approach, a memory system generally will be busy for a reduced time as compared to the old approach, so power consumption by the system will be less.

Figure 5:
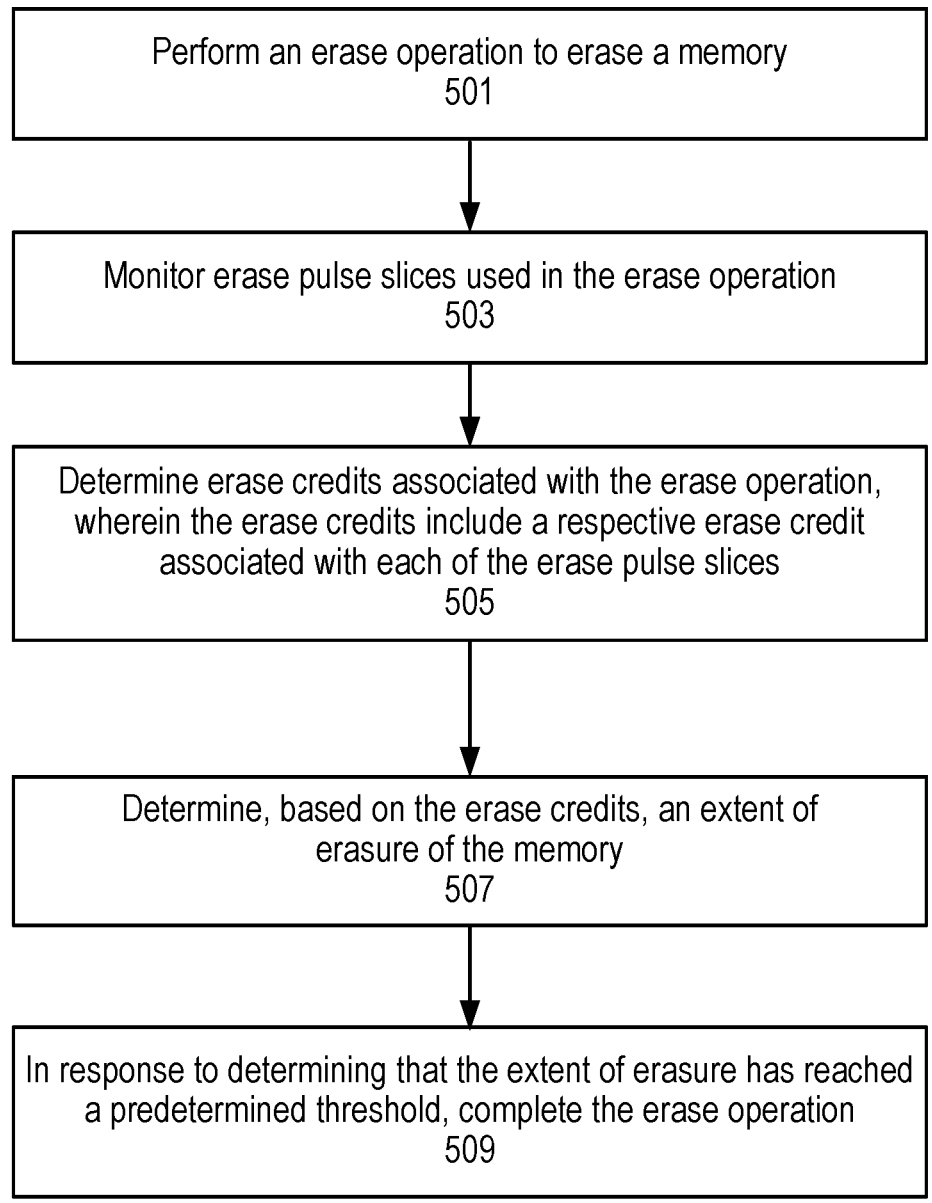
FIG. 5 shows a method for monitoring progress when erasing a memory, according to one embodiment.

FIG. 5 shows a method for monitoring progress when erasing a memory, according to one embodiment. For example, the method of FIG. 5 can be implemented in the system of FIGS. 1 and 2.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 5 is performed at least in part by one or more processing devices (e.g., processing device 111 of FIG. 1, or controller 254 of FIG. 2). In some embodiments, the method is implemented by a system using the processing device and memory of FIG. 7.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, an erase operation is performed to erase a memory. In one example, the memory is at least a portion of the array of memory cells 258 of FIG. 2.

At block 503, erase pulse slices used in the erase operation are monitored. In one example, the controller 254 of FIG. 2 monitors the erase pulse slices. In one example, the erase pulse slices include the pulse slice at block 325 of FIG. 3.

At block 505, erase credits associated with the erase operation are determined. The erase credits include a respective erase credit associated with each of the erase pulse slices. In one example, an ongoing erase credit total is maintained by controller 254 using one or more counters 256 of FIG. 2.

At block 507, an extent of erasure of the memory is determined based on the erase credits. In one example, the extent of erasure is determined based on the erase credit total stored in one of counters 256.

At block 509, in response to determining that the extent of erasure has reached a predetermined threshold, the erase operation is completed. In one example, the predetermined threshold is the credit threshold at block 321 in FIG. 3. If the credit threshold is reached, then any further erase pulse slices are discontinued.

In one embodiment, a method comprises: performing an erase operation to erase a memory (e.g., array of memory cells 258); monitoring erase pulse slices used in the erase operation; determining erase credits associated with the erase operation, wherein the erase credits include a respective erase credit associated with each of the erase pulse slices; determining, based on the erase credits, an extent of erasure of the memory; and in response to determining that the extent of erasure has reached a predetermined threshold (e.g., controller 254 comparing a credit total in counter 256 to a predetermined credit threshold), completing the erase operation.

In one embodiment, determining the extent of erasure comprises: determining a total of the erase credits; and comparing the total to the predetermined threshold.

In one embodiment, the memory is one or more subblocks of a memory array (e.g., array of memory cells 258).

In one embodiment, each respective erase credit is based on a time period of the corresponding erase pulse slice.

In one embodiment, each respective erase credit is further based on an erase voltage associated with the corresponding erase pulse slice.

In one embodiment, the erase operation further uses one or more ramps (e.g., the ramp at block 319 of FIG. 3), and the method further comprises determining a respective erase credit associated with each of the ramps.

In one embodiment, the erase credits associated with the erase operation further include each of the erase credits associated with the ramps.

In one embodiment, the method further comprises: counting a number of the ramps that have been interrupted by a suspend request; and in response to determining that the number of interrupted ramps has reached a threshold, disabling further interruption of the erase operation by any subsequent suspend request until the erase operation is completed.

In one embodiment, the method further comprises: during the erase operation, storing a total of the erase credits using a counter (e.g., counter 256); in response to receiving a suspend request, suspending the erase operation and performing a read operation; and after completing the read operation, determining whether to resume the erase operation based on the stored total of the erase credits.

In one embodiment, the method further comprises, in response to determining to resume the erase operation, resuming the erase operation without performing a verify operation to determine an erase state of the memory.

In one embodiment, the method further comprises, after completing the erase operation, resetting the counter in preparation for a subsequent erase operation.

In one embodiment, wherein a weight for each respective erase credit increases as a time period for the corresponding erase pulse slice increases.

In one embodiment, wherein completing the erase operation comprises performing a verify operation to determine whether the memory has been erased.

In one embodiment, the method further comprises, in response to determining based on the verify operation that the memory has not been erased, using at least one additional ramp or erase pulse slice in the erase operation.

In one embodiment, the method further comprises: after determining the extent of erasure of the memory, determining whether a suspend request has been received; in response to determining that a suspend request has been received, suspending the erase operation and performing a read operation; and after completing the read operation, resuming the erase operation.

In one embodiment, a system comprises: an array of memory cells configured to store data for a memory device;

at least one processing device; and memory containing instructions configured to instruct the at least one processing device to: perform an erase operation to erase at least a portion of the array of memory cells, the erase operation using erase pulse slices; determine erase credits associated with the erase operation, wherein the erase credits include a respective erase credit associated with each of the erase pulse slices; determine, based on the erase credits, an extent of erasure of the portion of the array of memory cells; and in response to determining that the extent of erasure has reached a predetermined threshold, complete the erase operation.

In one embodiment, the system further comprises a counter configured to store a total of the erase credits associated with the erase operation.

In one embodiment, the instructions are further configured to instruct the at least one processing device to: in response to a read request from a host device that requests data stored in the memory device, suspend the erase operation to provide an interruption point for performing a read operation; after completing the read operation, determine the total of the erase credits stored in the counter; and determine whether to resume the erase operation based on the stored total of the erase credits.

In one embodiment, the memory device is a NAND-type flash memory device, and the at least one processing device includes a controller configured to receive read requests from a host device.

In one embodiment, a non-transitory computer storage medium stores instructions which, when executed on at least one processing device, cause the at least one processing device to at least: perform an erase or program operation for a memory, the erase or program operation using pulse slices; determine credits associated with the erase or program operation, wherein the credits include a respective credit associated with each of the pulse slices; determine, based on the credits, an extent of erasure or programming of the memory; and in response to determining that the extent of erasure or programming has reached a predetermined threshold, complete the erase or program operation.

Figure 6:
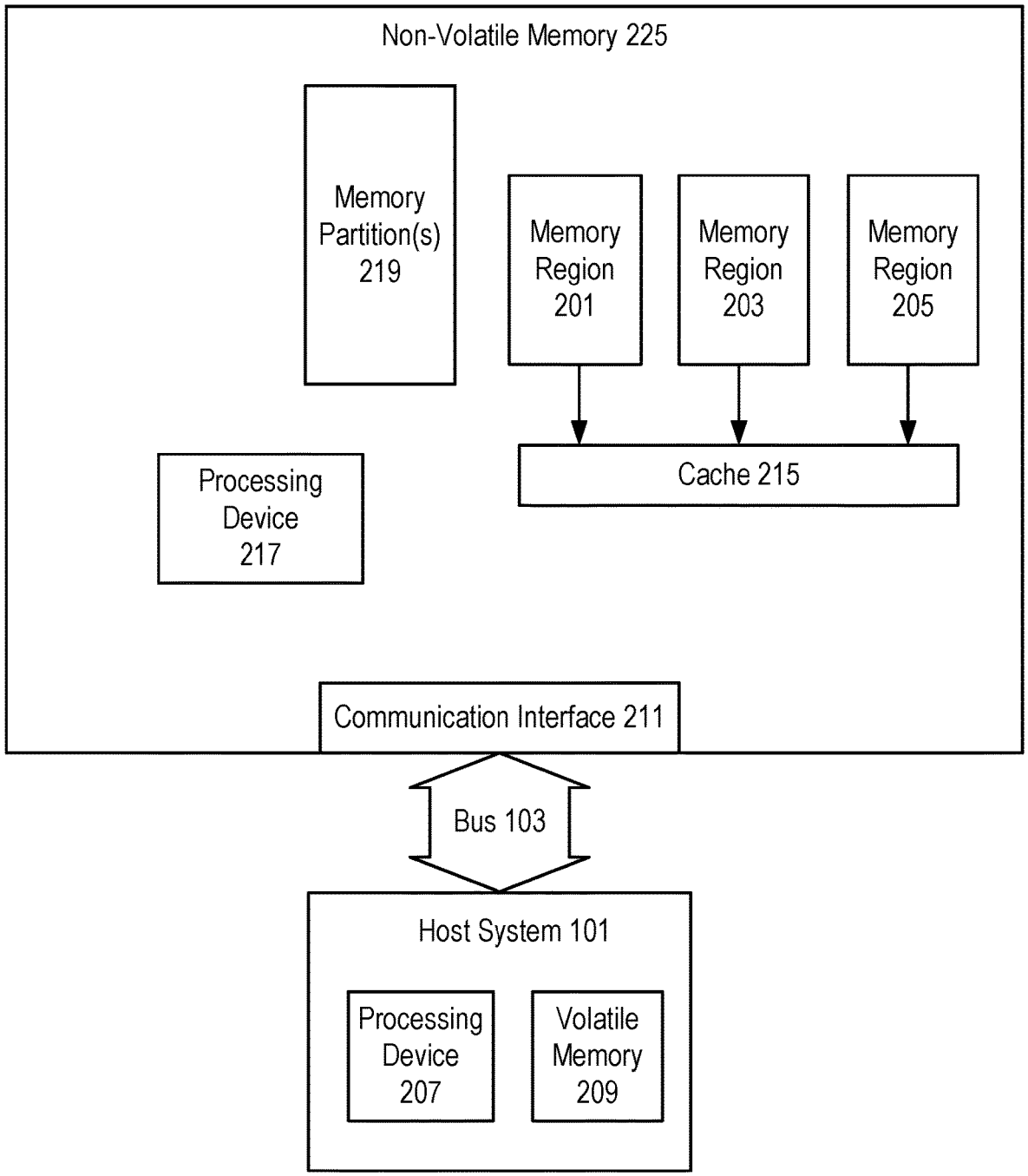
FIG. 6 shows a host system that accesses data stored in a non-volatile memory, according to one embodiment.

FIG. 6 shows a host system 101 that accesses data stored in a non-volatile memory 225, according to one embodiment. In one example, processing device 217 receives read and write commands from host system 101 over bus 103. The read command can be sent, for example, by a processing device 207 of the host system 101. In response to the read command, data is selected for providing as output data. The selected data is provided to bus 103 by communication interface 211. The selected data is copied by processing device 207 into volatile memory 209 of host system 101. In one example, volatile memory 209 is dynamic random-access memory (DRAM). In one example, volatile memory 209 is system memory for processing device 207.

In one embodiment, the data accessed is loaded into cache 215 from each of the memory regions 201, 203, and 205. In some cases, the data entry is accompanied by a code. In one example, the code is a hash of the data entry.

In some embodiments, processing device 217 and/or processing device 207 identify one or more memory partitions 219 to be used for servicing read requests for stored data. Any ongoing erase operation can be suspended to service the read requests using the erase credit component 107 discussed above. In one embodiment, a read command is received from host system 101. The read command is associated with a logical address. Processing device 217 determines physical addresses within memory regions 201, 203, 205 that correspond to the logical address. Data from these physical addresses is sequentially loaded into cache 215 as data is sequentially read from non-volatile memory 225 and provided to host system 101.

In one embodiment, data portions can be read from each of the memory regions. In one example, the data portions correspond to blocks or pages of data.

In one example, volatile memory 209 includes DRAM and/or SRAM. In one example, processing device 217 is a state machine that receives read commands (e.g., read commands to read a block or page of data).

In one embodiment, data transfer by processing device 217 is initiated by a signal sent by processing device 207 to processing device 217. The signal can be sent in response to various events as determined by processing device 207. For example, a machine learning model can provide a result to processing device 207. The signal can be sent in response to the result.

In one embodiment, the machine learning model receives inputs based on data received from various computing systems. In one example, the data is sensor data received from vehicle systems of an autonomous vehicle.

An output from the machine learning model can be used by processing device 207 as a basis for initiating data transfer (e.g., responding to a read command) by processing device 217. In one example, non-volatile memory 225 is flash memory or a solid-state drive (SSD).

In one embodiment, system memory used by processing device 207 resides in volatile memory 209. Processing device 207 can initiate a data transfer process in response to various events (e.g., a detection of a loss of power to a memory or other component of the computing system).

In one embodiment, a host system (e.g., host system 101) can collect data from sensors of an embedded system. For example, the sensors can be located on an autonomous vehicle and collect image data used for navigation of the vehicle. In one embodiment, the sensor data is input to the machine learning model (e.g., a neural network) and an output is used to control the vehicle. In one embodiment, the processing associated with a neural network is performed by processing device 207, either alone or in conjunction with a processing device of the host system.

In one embodiment, a neural network is trained or operated using processing device 207. During training or other operation of the neural network, data is read from and written to volatile memory 209 and/or non-volatile memory 225.

In one embodiment, controller(s) used to access non-volatile memory 225 can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or another suitable processor. The controller can include one or more processors (processing devices) configured to execute instructions stored in local memory.

Local memory of the controller can include an embedded memory configured to store instructions for performing various processes, operations, logic flows, and routines that control aspects of operation for the memory system. Local memory of the controller can include read-only memory (ROM) for storing micro-code and/or memory registers storing, for example, memory pointers, fetched data, etc.

Figure 7:
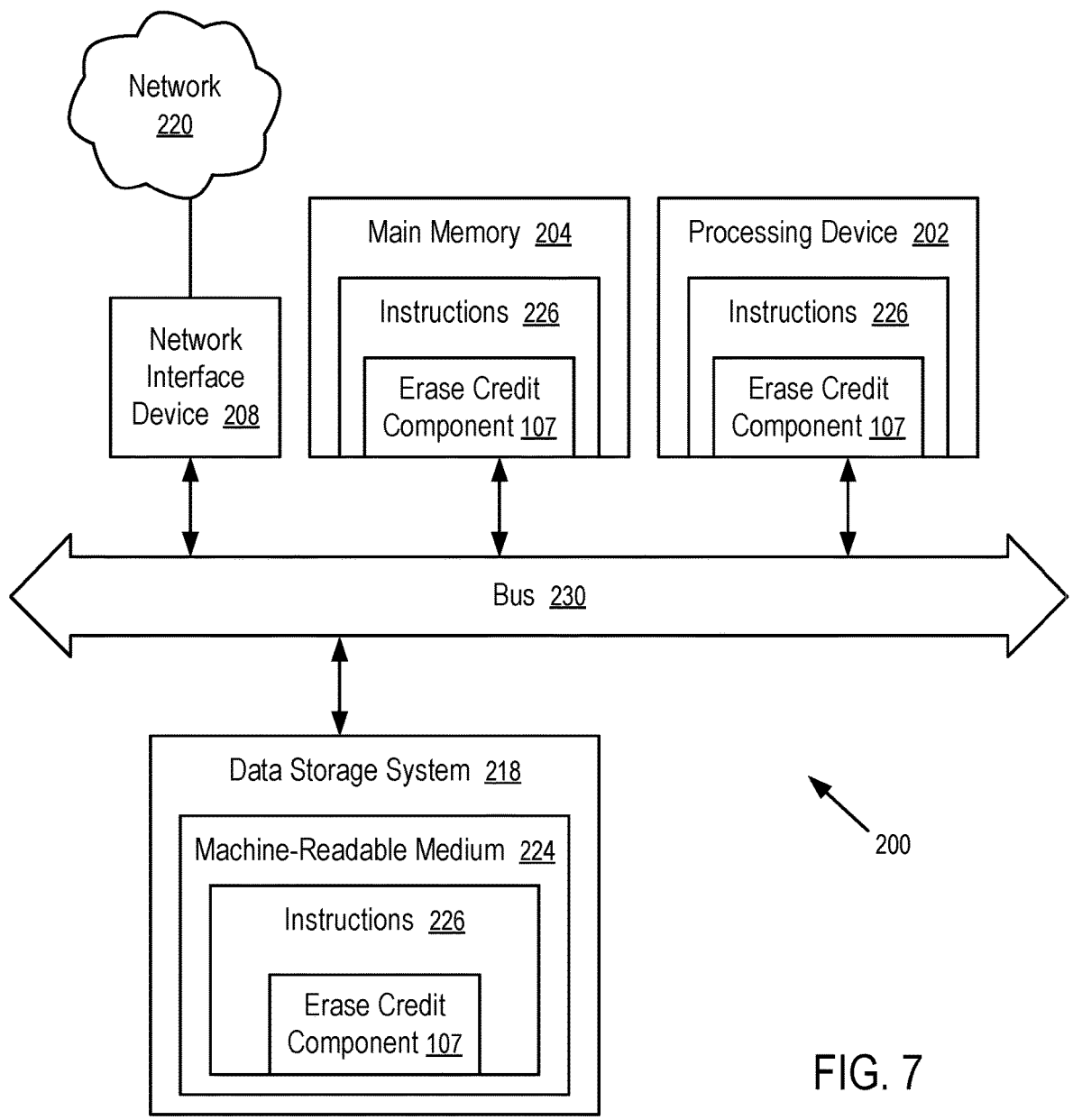
FIG. 7 is a block diagram of an example computer system in which embodiments of the present disclosure can operate.

FIG. 7 is a block diagram of an example computer system 200 in which embodiments of the present disclosure can operate. In one embodiment, in computer system 200 a set of instructions, for causing a machine to perform any one or more of the methodologies discussed herein, can be executed. In some embodiments, the computer system 200 can correspond to a memory system, or to a host system that includes, is coupled to, or utilizes a memory system (e.g., the memory system 105 of FIG. 1) or can be used to perform the operations of an erase credit component 107 (e.g., to execute instructions to perform operations corresponding to the erase credit component 107 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory system 105 of FIG. 1.

In one embodiment, the instructions 226 include instructions to implement functionality corresponding to erase credit component 107 (e.g., the erase credit component 107 described with reference to FIGS. 1-6). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Closing

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, "coupled to" generally refers to a connection between components, which can be an indirect communicative connection or direct communicative connection (e.g., without intervening components), whether wired or wireless, including connections such as electrical, optical, magnetic, etc.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface.

Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system and the memory sub-system. The host system can further utilize an NVM Express (NVMe) interface to access memory components of the memory sub-system when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, and/or a combination of communication connections.

In one embodiment, the host system includes a processing device and a controller. The processing device of the host system can be, for example, a microprocessor, a graphics processing unit, a central processing unit (CPU), an FPGA, a processing core of a processor, an execution unit, etc. In one example, the processing device can be a single package that combines an FPGA and a microprocessor, in which the microprocessor does most of the processing, but passes off certain predetermined, specific tasks to an FPGA block. In one example, the processing device is a soft microprocessor (also sometimes called softcore microprocessor or a soft processor), which is a microprocessor core implemented using logic synthesis. The soft microprocessor can be implemented via different semiconductor devices containing programmable logic (e.g., ASIC, FPGA, or CPLD).

In some examples, the controller is a memory controller, a memory management unit, and/or an initiator. In one example, the controller controls the communications over a bus coupled between the host system and the memory sub-system.

In general, the controller can send commands or requests to the memory sub-system for desired access to the memory components. The controller can further include interface circuitry to communicate with the memory sub-system. The interface circuitry can convert responses received from the memory sub-system into information for the host system. The controller of the host system can communicate with the controller of the memory sub-system to perform operations such as reading data, writing data, or erasing data at the memory components and other such operations.

In some instances, a controller can be integrated within the same package as the processing device. In other instances, the controller is separate from the package of the processing device. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory.

In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

The controller of the memory sub-system can communicate with the memory components to perform operations such as reading data, writing data, or erasing data at the memory components and other such operations (e.g., in response to commands scheduled on a command bus by a controller). A controller can include a processing device (processor) configured to execute instructions stored in local memory. The local memory of the controller can include an embedded memory configured to store instructions for performing various processes, operations, logic flows, and routines that control operation of the memory sub-system, including handling communications between the memory sub-system and the host system. In some embodiments, the local memory can include memory registers storing memory pointers, fetched data, etc. The local memory can also include read-only memory (ROM) for storing micro-code. While the example memory sub-system includes the controller, in another embodiment of the present disclosure, a memory sub-system may not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory sub-system can also include additional circuitry or components that are not illustrated. In some embodiments, the memory sub-system can include a cache or buffer (e.g., DRAM or SRAM) and address circuitry (e.g., a row decoder and a column decoder) that can receive an address from the controller and decode the address to access the memory components.

What is claimed is:

1. A system comprising:
   a counter;
   memory cells configured to store data for a memory device;
   at least one processing device; and memory containing instructions configured to instruct the at least one processing device to:
perform an erase operation to erase at least a portion of the memory cells, the erase operation using erase pulse slices;
determine erase credits associated with the erase operation, wherein the erase credits include a respective erase credit associated with a corresponding one of the erase pulse slices;
store, using the counter, a total of the erase credits associated with the erase operation;
determine, based on the stored total of the erase credits, an extent of erasure of the portion of the memory cells;
in response to determining that the extent of erasure has reached a threshold, complete the erase operation;
in response to a read request from a host device that requests data stored in the memory device, suspend the erase operation to provide an interruption point for performing a read operation; and
after completing the read operation, determine whether to resume the erase operation based on the stored total of the erase credits.

2. The system of claim 1, wherein the instructions are further configured to instruct the at least one processing device to:
after completing the read operation, determine the total of the erase credits stored in the counter; and
determine whether to resume the erase operation based on the stored total of the erase credits.

3. The system of claim 2, wherein the instructions are further configured to instruct the at least one processing device to, in response to determining to resume the erase operation, resume the erase operation without performing a verify operation to determine an erase state of the memory.

4. The system of claim 2, wherein the instructions are further configured to instruct the at least one processing device to, after completing the erase operation, reset the counter in preparation for a subsequent erase operation.

5. The system of claim 1, wherein the memory device is a flash memory device, and the at least one processing device includes a controller configured to receive requests from a host device.

6. The system of claim 1, wherein completing the erase operation comprises performing a verify operation to determine whether the portion of the memory cells has been erased.

7. The system of claim 6, wherein the instructions are further configured to instruct the at least one processing device to, in response to determining that the portion of the memory cells has not been erased, use at least one additional ramp or erase pulse slice in the erase operation.

8. The system of claim 1, wherein the instructions are further configured to instruct the at least one processing device to:
after determining the extent of erasure, determine whether a suspend request has been received;
in response to determining that the suspend request has been received, suspend the erase operation and perform a read operation; and
after completing the read operation, resume the erase operation.

9. A method comprising:
monitoring, by a controller of a memory device, an erase operation using one or more ramps;
determining, by the controller, erase credits associated with the erase operation, wherein each erase credit is based on a magnitude of an erase voltage and is associated with a respective one of the ramps;
storing, using a counter, a total of the erase credits;
determining, based on the stored total of erase credits, an extent of erasure;
in response to determining that the extent of erasure has reached a threshold, completing the erase operation;
in response to a read request from a host device that requests data stored in the memory device, suspend the erase operation to provide an interruption point for performing a read operation; and
after completing the read operation, determining whether to resume the erase operation based on the stored total of the erase credits.

10. The method of claim 9, wherein determining the extent of erasure comprises comparing the stored total to the threshold.

11. The method of claim 9, wherein the memory device includes a flash memory array.

12. The method of claim 9, wherein the respective erase credit associated with each of the ramps is determined based on a voltage profile of the ramp.

13. The method of claim 9, further comprising:
counting a number of the ramps that have been interrupted by a suspend request; and
in response to determining that the number of interrupted ramps has reached a threshold, disabling further interruption of the erase operation by any subsequent suspend request until the erase operation is completed.

14. The method of claim 9, further comprising, resuming the erase operation without performing a verify operation to determine an erase state of memory cells of the memory device.

15. The method of claim 9, further comprising, after completing the erase operation, resetting the counter.

16. A non-transitory machine-readable storage medium storing instructions which, when executed on at least one processing device, cause the at least one processing device to:
perform an erase operation for a memory, wherein the erase operation uses one or more ramps;
determine credits associated with the erase operation, including determining a respective credit associated with each of the ramps;
store a number of the credits associated with the erase operation;
determine, based on the stored number of the credits, an extent of erasure of the memory;
in response to determining that the extent of erasure has reached a first threshold, complete the erase operation;
in response to receiving a suspend request, suspend the erase operation;
in response to receiving the suspend request, perform a read operation; and
determine whether to resume the erase operation based on the stored number of the credits.

17. The non-transitory machine-readable storage medium of claim 16, wherein the instructions further cause the at least one processing device to:
resume the erase operation without performing a verify operation to determine an erase state of the memory.

18. The non-transitory machine-readable storage medium of claim 16, wherein the respective credit associated with each of the ramps is determined based on a time period of the ramp.

19. The non-transitory machine-readable storage medium of claim 16, wherein the instructions further cause the at least one processing device to:
- count a number of the ramps that have been interrupted by a suspend request; and
- in response to determining that the number of interrupted ramps has reached a second threshold, disable further interruption of the erase operation until the erase operation is completed.

* * * * *